Patented May 6, 1941

2,240,935

UNITED STATES PATENT OFFICE 2,240,935

SULPHUR TRIOXIDE

Maurice Lepin, le Peage de Roussillon, France, assignor to Societe Rhodiaceta, Lyon, France, a corporation of France No Drawing. Application March 18, 1939, Serial No. 262,636. In France March 21, 1938

10 Claims. (Cl. 23—250)

This invention relates to the stabilizing and handling of sulphur trioxide and is more particularly directed to the improvement of sulphur trioxide by the inclusion therein of small amounts of an aliphatic acid or acid anhydride.

In a number of applications such as organic chemical reactions either 100% sulphuric acid or oleum is customarily used. The sulphur trioxide content varies with the sulphuric acid concentration or oleum strength but the strongest oleum commercially available contains no more than about 60 to 65% $SO_3$. However, for numerous sulphonation reactions more highly sulphonated products and better yields could be obtained by replacing oleum with sulphur trioxide itself which is more reactive. Unfortunately the use of sulphur trioxide, or oleum at a very high concentration, is practically prohibited by reason of the difficulty of handling and keeping these products.

High strength oleum solidifies readily due, apparently, to the formation of relatively high melting point compounds of $SO_3$ and $H_2SO_4$. Liquid sulphur trioxide not only solidifies when it is kept for some time below 25° C. but additionally polymerizes in such a way that when kept for some days at a temperature from about 15 to 20° C. in the solid state it may not readily be melted. The alpha form of sulphur trioxide melts at about 16° C. but the beta form must be heated to about 45 to 50° C. to effect a depolymerization. Apparently the solidification of the alpha form is accompanied by a slow polymerization to the beta form. The conversion of the solidified beta-form of sulphur trioxide to a usable condition is slow because of the very poor heat conductivity of sulphur trioxide and because large quantities of heat are needed. The sulphur trioxide obtained by heating is in the gaseous state and must be condensed in order to obtain liquid sulphur trioxide in a condition ready for use.

As a consequence of the difficulty of handling sulphur trioxide as set out above this material has not enjoyed as wide a use as it should and it has not as yet successfully been applied to all its possible uses in industry, particularly as a sulphonating agent.

This invention has for an object the stabilizing of liquid sulphur trioxide. It is a further object of this invention to lower the freezing point of liquid sulphur trioxide and to facilitate the maintenance of the material in liquid condition. It is a still further object of this invention to provide a sulphur trioxide composition which upon solidification by freezing will readily assume a liquid condition upon moderate heating. Still further objects will become apparent hereinafter.

These and other objects of the invention are effected by stabilizing sulphur trioxide by means of a liquid aliphatic acid or an aliphatic acid anhydride or by a mixture of such an acid and anhydride. Particularly excellent results are obtained using acetic acid and acetic anhydride.

Stabilized sulphur trioxide containing an aliphatic acid or anhydride is obtained by one of the usual processes for introducing one reagent into another, the most favorable conditions being a rather low temperature and intense agitation. Preferably sulphur trioxide is added in a gaseous or liquid form to the aliphatic acid or anhydride. Under these conditions sulphur trioxide can be introduced into the stabilizing agent in such large quantities that the liquid finally obtained contains only small amounts of the stabilizing agent while preserving its qualities. As soon as the aliphatic stabilizing agent has absorbed three to four times its weight of sulphur trioxide, large quantities of sulphur trioxide can then be added without regard to the rise in temperature.

Despite the high content of sulphur trioxide in the preferred products of the invention they fume but little in the open air and present very much lower solidification points than oleum of corresponding concentration.

It is not understood precisely what form the sulphur trioxide assumes when modified according to this invention but as a matter of theory it can be assumed that the final product is a solution.

As has been observed above, sulphur trioxide may be stabilized with an aliphatic acid or acid anhydride. The acids and anhydrides selected should be liquid at the temperature of use and in that state should be insensitive to the oxidizing or degrading action of sulphur trioxide. It will be understood that mixtures of aliphatic acids and their anhydrides may be used or mixtures of aliphatic acids with the anhydrides of different aliphatic acids may be used. While, as observed, any aliphatic acid or aliphatic acid anhydride liquid under the conditions of use and not oxidized or degraded by sulphur trioxide may be used, it is preferred to employ acetic acid or acetic anhydride or, even better, a mixture of acetic acid and acetic anhydride.

The amount of stabilizing agent to be employed in liquid sulphur trioxide will vary with the use for which the sulphur trioxide is intended and with the conditions it will be expected to meet. The influence of the aliphatic stabilizing agents is proportional to the amount present and in general it may be found desirable to use about as small an amount as will effect the required lowering of freezing point of the liquid sulphur trioxide and the required stability. Relatively larger amounts of stabilizing agent may be used if the presence of an excess is not objectionable tho in general it is not desirable or economical to use more than is required to effect the desired lowering of the melting point. It will ordinarily be found desirable to use no more than about 10% of stabilizing agent.

Sulphur trioxide stabilized according to the present invention can advantageously be substituted for oleum in a wide variety of uses and may be used with particular advantage in processes wherein sulphur trioxide has previously been used with great technical difficulties by reason of the tendency to solidify. The stabilized sulphur trioxide of this invention will be found particularly advantageous in industry because it can be used in the liquid state without difficulty and it can be allowed to flow from a container thru a cock or valve and thru piping without danger of plugging by solidification at normal temperature.

The practice of this invention will be better understood by reference to the following illustrative examples.

Example I

A receptacle with a reflux condenser and externally cooled with a current of water is provided with an inlet tube for sulphur trioxide. The lower end of the tube is closed but is perforated with a number of small diameter holes and hence acts as a strainer. The strainer is located at the bottom of the receptacle and is covered with a mixture composed of ninety-three parts by weight of acetic acid and seven parts by weight of acetic anhydride. It is observed that the quantity of liquid must be sufficient to cover the strainer. A current of gaseous sulphur trioxide is passed thru the tube into the receptacle and thru the strainer, and it is found that the sulphur trioxide is entirely dissolved and in all proportions when the temperature is kept at about 45 to 46° C. Depending upon the length of time that the absorption is continued a stabilized sulphur trioxide containing 90 to 95% sulphur trioxide and even more is obtained. If, for example, the operation is stopped when the product contains 93% $SO_3$ a stabilified sulphur trioxide is obtained the melting point of which is —4° C. It is noted that oleum corresponding to 7% of sulphur trioxide solidifies at 24 to 25° C.

The products obtained according to the procedure of this example can satisfactorily be used for any purpose for which sulphur trioxide would be used and are particularly satisfactory for sulphonations.

Example II

The procedure of Example I is followed but when the acetic acid-acetic anhydride mixture has absorbed four times its weight in sulphur trioxide the absorption is stopped. The stabilized sulphur trioxide thus formed contains about 80% sulphur trioxide. To the stabilized sulphur trioxide there is added twice its weight of liquid sulphur trioxide and practically no liberation of heat is observed. A stabilized sulphur trioxide with 93 to 94% $SO_3$ is obtained.

Example III

Into a tank cooled on the outside and equipped for intense agitation 100 grams of acetic acid is introduced and then 1450 grams of liquid sulphur trioxide is slowly poured in while maintaining the temperature near 0° C. A stabilized sulphur trioxide with about 93% $SO_3$ is obtained. The product commences to assume a pasty state at about 5° C. by reason of the presence of a certain quantity of the beta form but the product can be cooled to a —4 or —5° C. without any indications of solidifying.

While certain specific compositions, proportions, and practices are shown above for purposes of illustration, it will be understood that those skilled in the art may readily employ liquid aliphatic acids and anhydrides for stabilizing sulphur trioxide in a variety of ways without departing from the spirit of this invention.

I claim:

1. In a process for stabilizing sulphur trioxide so that it will remain liquid at ordinary temperatures, the step comprising adding sulphur trioxide to anhydrous acetic acid, the amount of the acetic acid being sufficient to stabilize the sulphur trioxide.

2. In a process for stabilizing sulphur trioxide so that it will remain liquid at ordinary temperatures, the step comprising adding sulphur trioxide to acetic acid anhydride, the amount of acetic acid anhydride being sufficient to stabilize the sulphur trioxide.

3. In a process for stabilizing sulphur trioxide so that it will remain liquid at ordinary temperatures, the step comprising adding sulphur trioxide to a mixture of anhydrous acetic acid and acetic acid anhydride, the amount of acetic acid and acetic acid anhydride being sufficient to stabilize the sulphur trioxide.

4. In a process for stabilizing sulphur trioxide so that it will remain liquid at ordinary temperatures, the steps comprising adding three to four parts by weight of sulphur trioxide to one part by weight of anhydrous acetic acid; the addition being effected with cooling and with agitation, and then adding a further quantity of sulphur trioxide to the mixture.

5. In a process for stabilizing sulphur trioxide so that it will remain liquid at ordinary temperatures, the steps comprising adding three to four parts by weight of sulphur trioxide to one part by weight of acetic acid anhydride, the addition being effected with cooling and with agitation, and then adding a further quantity of sulphur trioxide to the mixture.

6. In a process for stabilizing sulphur trioxide so that it will remain liquid at ordinary temperatures, the steps comprising adding three to four parts by weight of sulphur trioxide to one part by weight of a mixture of anyhdrous acetic and acetic acid anhydride, the addition being effected with cooling and with agitation, and then adding a further quantity of sulphur trioxide to the mixture.

7. Liquid sulphur trioxide stabilized by the presence of anhydrous acetic acid.

8. Liquid sulphur trioxide stabilized by the presence of acetic anhydride.

9. Liquid sulphur trioxide stabilized by the presence of anhydrous acetic acid and acetic anhydride.

10. A liquid sulphur trioxide-containing composition comprised of not substantially less than about ninety per cent $SO_3$ and stabilized by the presence of a compound selected from the group consisting of anhydrous acetic acid and acetic anhydride.

MAURICE LEPIN.